United States Patent
Nyhavn

(10) Patent No.: US 11,674,382 B2
(45) Date of Patent: *Jun. 13, 2023

(54) METHOD FOR EXTRACTING DOWNHOLE FLOW PROFILES FROM TRACER FLOWBACK TRANSIENTS

(71) Applicant: RESMAN AS, Trondheim (NO)

(72) Inventor: Fridtjof Nyhavn, Trondheim (NO)

(73) Assignee: RESMAN AS, Trondheim (NO)

( * ) Notice: Subject to any disclaimer, the term of this patent is extended or adjusted under 35 U.S.C. 154(b) by 107 days.

This patent is subject to a terminal disclaimer.

(21) Appl. No.: 17/199,937

(22) Filed: Mar. 12, 2021

(65) Prior Publication Data

US 2021/0199003 A1 Jul. 1, 2021

Related U.S. Application Data

(63) Continuation of application No. 16/871,939, filed on May 11, 2020, now Pat. No. 10,961,842, which is a
(Continued)

(30) Foreign Application Priority Data

Oct. 29, 2010 (NO) .................................. 20101521

(51) Int. Cl.
*E21B 47/11* (2012.01)
*E21B 43/14* (2006.01)
(Continued)

(52) U.S. Cl.
CPC .............. *E21B 47/11* (2020.05); *E21B 27/02* (2013.01); *E21B 43/14* (2013.01); *G01V 9/00* (2013.01)

(58) Field of Classification Search
CPC .......... E21B 47/11; E21B 47/02; E21B 43/14; G01V 9/00
See application file for complete search history.

(56) References Cited

U.S. PATENT DOCUMENTS 3,508,875 A 4/1970 Sandiford
3,964,294 A 6/1976 Shair et al.
(Continued)

FOREIGN PATENT DOCUMENTS

EP 1 416 118 A1 5/2004
WO WO 2006/004426 A1 1/2006
WO WO 2010/142328 A1 12/2010

OTHER PUBLICATIONS

Huseby, "Monitoring Reservoir Fluid Dynamics—The Role of Tracer Technology," OG21 Innovation Seminar TTA2, Exploration and Reservoir Characterization, Bergen, Mar. 4, 2009, 21 pages.
(Continued)

*Primary Examiner* — Catherine T. Rastovski
*Assistant Examiner* — Kaleria Knox
(74) *Attorney, Agent, or Firm* — Birch, Stewart, Kolasch & Birch, LLP

(57) ABSTRACT

A method of estimating an influx profile for at least one well fluid to a producing petroleum well with two or more influx zones or influx locations to a production flow, wherein the well comprises tracer sources with distinct tracer materials in known levels of the well, at least one of said tracer sources arranged downstream and exposed to the fluids in at least one of said influx zones, wherein each said tracer source has an even release rate to said well fluid, characterised in that one or more of the tracer sources is provided in one or more delay chambers for ventilating out fluid with leaked tracer material at a time constant which is significantly longer than the diffusion rate from the tracer source to the well fluid, wherein the method further comprises: providing samples, the samples collected from the production flow at a location downstream of the tracer sources during a time period in which the tracer transient is detectable at the downstream location, analysing said samples for concentration and type of tracer material from said possible tracer sources as a
(Continued)

function of sampling time or cumulative produced volume; and based on said measured concentrations and their sampling time or cumulative produced volume, calculating said influx volumes.

17 Claims, 8 Drawing Sheets

Related U.S. Application Data continuation of application No. 16/290,130, filed on Mar. 1, 2019, now Pat. No. 10,669,839, which is a continuation of application No. 13/887,046, filed on May 3, 2013, now Pat. No. 10,253,619, which is a continuation-in-part of application No. 13/882,054, filed as application No. PCT/NO2011/000306 on Oct. 31, 2011, now Pat. No. 8,949,029.

(60) Provisional application No. 61/408,143, filed on Oct. 29, 2010.

(51) Int. Cl.
    *E21B 27/02* (2006.01)
    *G01V 9/00* (2006.01)

(56) References Cited

U.S. PATENT DOCUMENTS

| | | | |
|---|---|---|---|
| 3,991,827 A | 11/1976 | Schall | |
| 4,008,763 A | 2/1977 | Lowe, Jr. | |
| 4,055,399 A | 10/1977 | Parrish | |
| 4,167,870 A | 9/1979 | Haas | |
| 4,264,329 A | 4/1981 | Beckett | |
| 4,420,566 A | 12/1983 | Schmitt | |
| 4,520,109 A | 5/1985 | Simmonds et al. | |
| 4,555,489 A | 11/1985 | Schmitt | |
| 4,861,986 A | 8/1989 | Arnold | |
| 4,986,353 A | 1/1991 | Clark et al. | |
| 5,077,471 A | 12/1991 | Smith, Jr. et al. | |
| 5,212,093 A | 5/1993 | Richardson et al. | |
| 5,284,663 A | 2/1994 | Speaker | |
| 5,723,781 A | 3/1998 | Pruett et al. | |
| 5,881,807 A | 3/1999 | Bøe et al. | |
| 5,892,147 A | 4/1999 | Garnes et al. | |
| 6,003,365 A | 12/1999 | Pope et al. | |
| 6,118,519 A | 9/2000 | Ipponmatsu et al. | |
| 6,125,934 A | 10/2000 | Lenn et al. | |
| 6,214,624 B1 | 4/2001 | Barker et al. | |
| 2001/0036667 A1 | 11/2001 | Tayebi et al. | |
| 2003/0056952 A1* | 3/2003 | Stegemeier | E21B 47/113 166/250.12 |
| 2005/0252286 A1* | 11/2005 | Ibrahim | G01N 33/2823 73/152.55 |
| 2007/0241277 A1 | 10/2007 | Stray et al. | |
| 2009/0084545 A1 | 4/2009 | Banerjee et al. | |
| 2009/0271115 A1 | 10/2009 | Davis et al. | |
| 2010/0147066 A1 | 6/2010 | Ziauddin | |
| 2010/0236776 A1 | 9/2010 | Spross et al. | |
| 2010/0258303 A1 | 10/2010 | Alberty | |
| 2010/0307743 A1 | 12/2010 | Ziauddin | |
| 2011/0139442 A1 | 6/2011 | Ziauddin et al. | |
| 2011/0189778 A1 | 8/2011 | Daniel et al. | |
| 2011/0257887 A1* | 10/2011 | Cooper | E21B 47/11 702/12 |
| 2012/0010819 A1 | 1/2012 | Ansari et al. | |

OTHER PUBLICATIONS

Krogh et al., "Dynamic Flow Simulation of a Well Clean-up Operation at the Asgard Field," Society of Petroleum Engineers, SPE124653, Annual Technical Conference and Exhibition, New Orleans, Louisiana, USA, Oct. 4-7, 2009, pp. 1-14.

Nyhavn et al., "Permanent Tracers Embedded in Downhole Polymers Prove Their Monitoring Capabilities in a Hot Offshore Well," Society of Petroleum Engineers, SPE135070, Annual Technical Conference and Exhibition, Florence, Italy, Sep. 19-22, 2010, pp. 1-15.

PICT, "PICT Forum Minutes," Houston, USA, May 5-6, 2011 (Document dated: May 25, 2011), 6 pages.

PICT, "PICT Meeting Agenda," Houston, USA, Forum Held May 5-6, 2011 (Document dated: Apr. 27, 2011), 1 page.

PICT, "PICT Objectives;" Meeting Objectives, Aug. 21, 2009 (Retrieved Mar. 22, 2018), Next Meeting: Copenhagen, Denmark, Oct. 27-28, 2009, 1 page.

PICT, "Presentations," Screenshots of Presentations section of Inflow Control Technology (Formerly PICT), No known date, 2 pages.

PICT, "Welcome to the Passive Inflow Control Technolody website!" https://inflowcontrol.com, Retrieved Mar. 22, 2018, 1 page.

PICT, "Wireless Reservoir Surveillance for IGD Screens," PICT Forum, Houston, USA, May 5-6, 2011, 50 pages.

Press et al., "Numerical Recipes, The Art of Scientific Computing," Chapter 14, Modeling Data, 1987, pp. 498-499 (10 pages total).

U.S. Appl. No. 16/871,939, filed May 11, 2020.
U.S. Appl. No. 16/290,130, filed Mar. 1, 2019.
U.S. Appl. No. 13/887,046, filed May 3, 2013.
U.S. Appl. No. 13/882,054, filed Jun. 20, 2013.

* cited by examiner

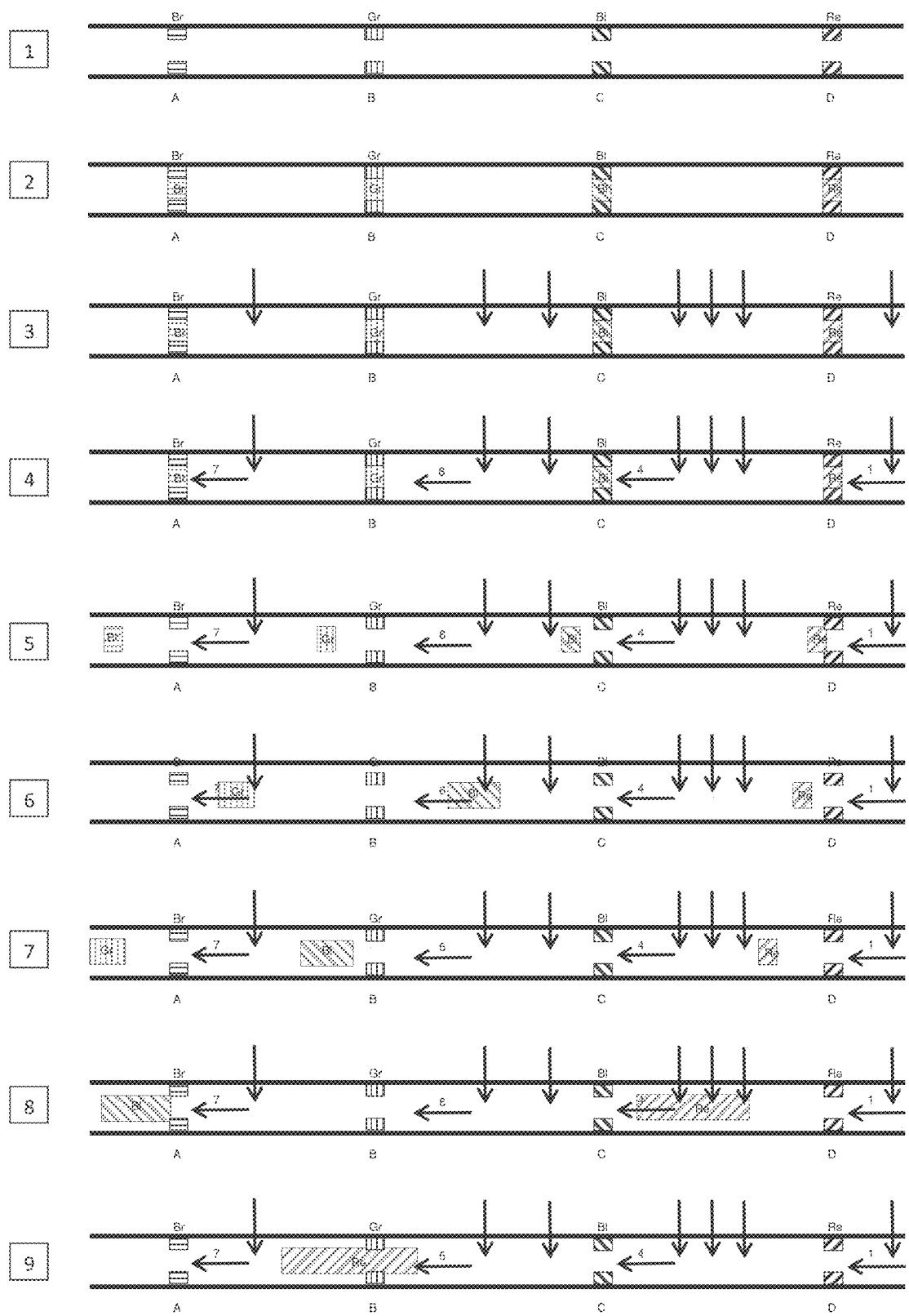
Fig. 1 – tracer shot technique
Tracer colour marking: Br: brown, Gr: green, Bl: blue, Re: red.

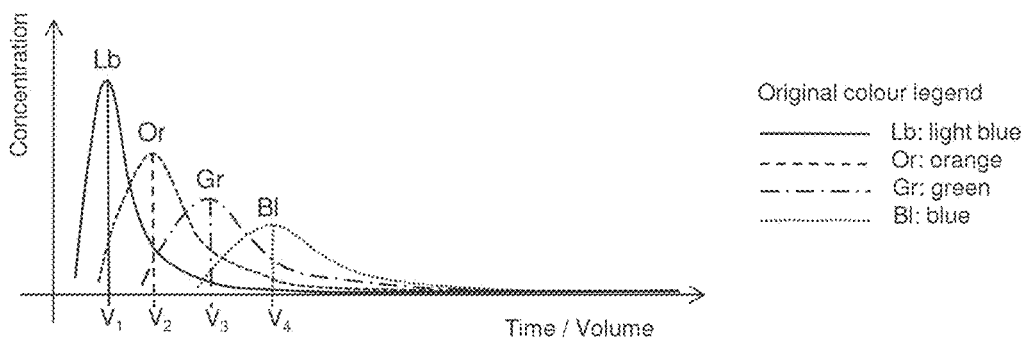
Fig. 2 – arrival of tracers at the sampling site topside as a function of time or produced volume after release in different zones.
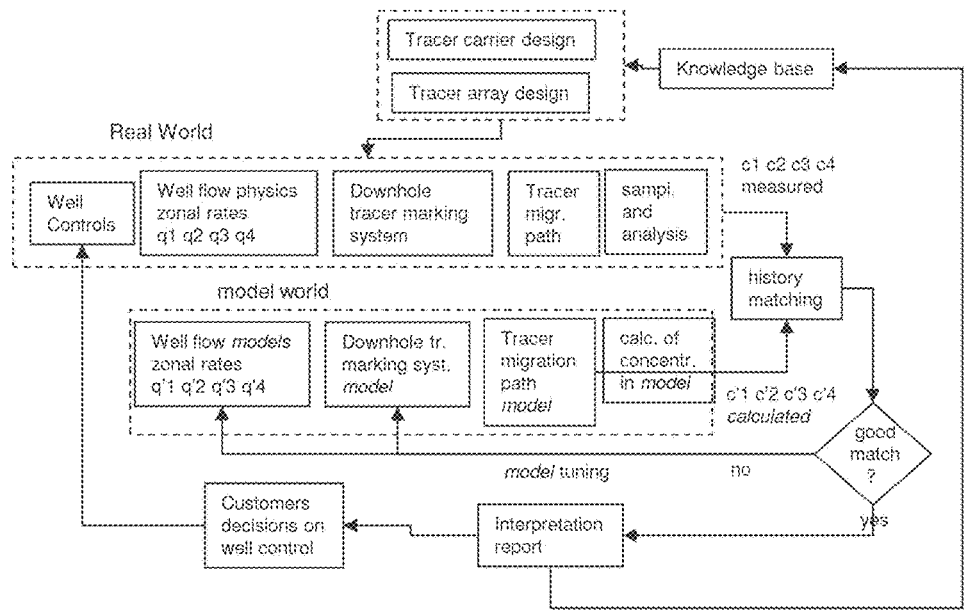
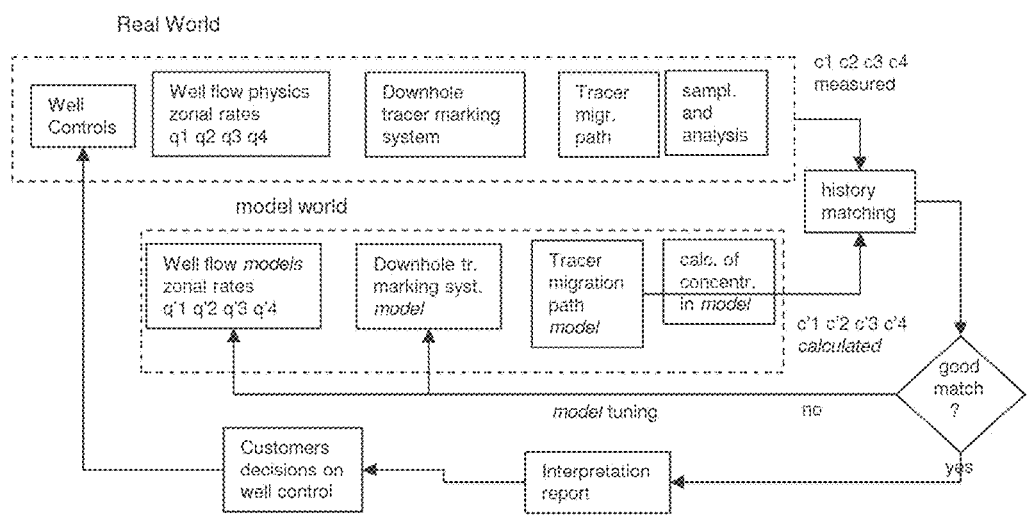
Fig. 3

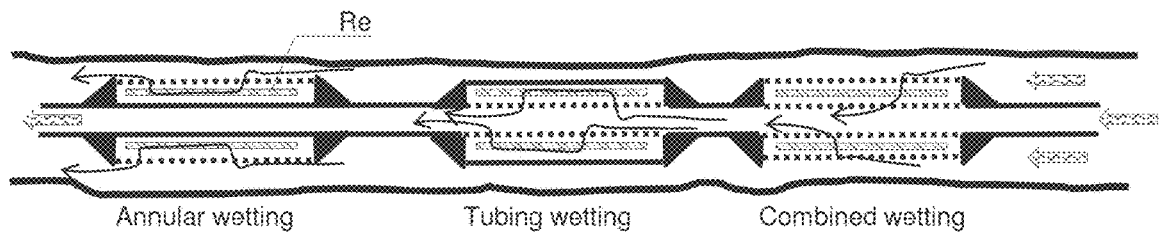
Annular wetting     Tubing wetting     Combined wetting
Fig. 4 Different configurations for the downhole completions and how the tracer systems are placed into these (the red rods:Re):
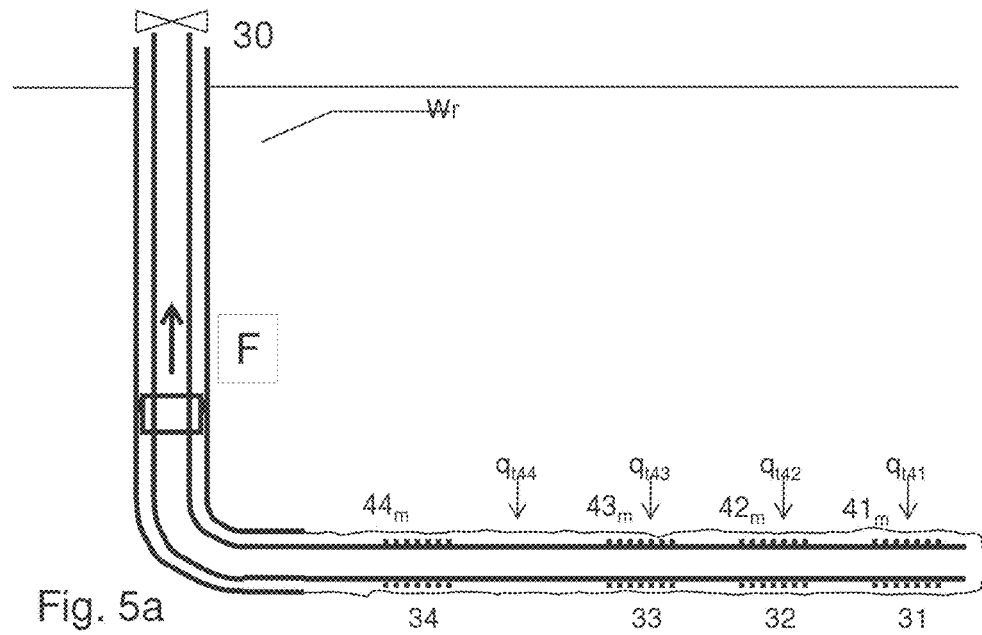
Fig. 5a
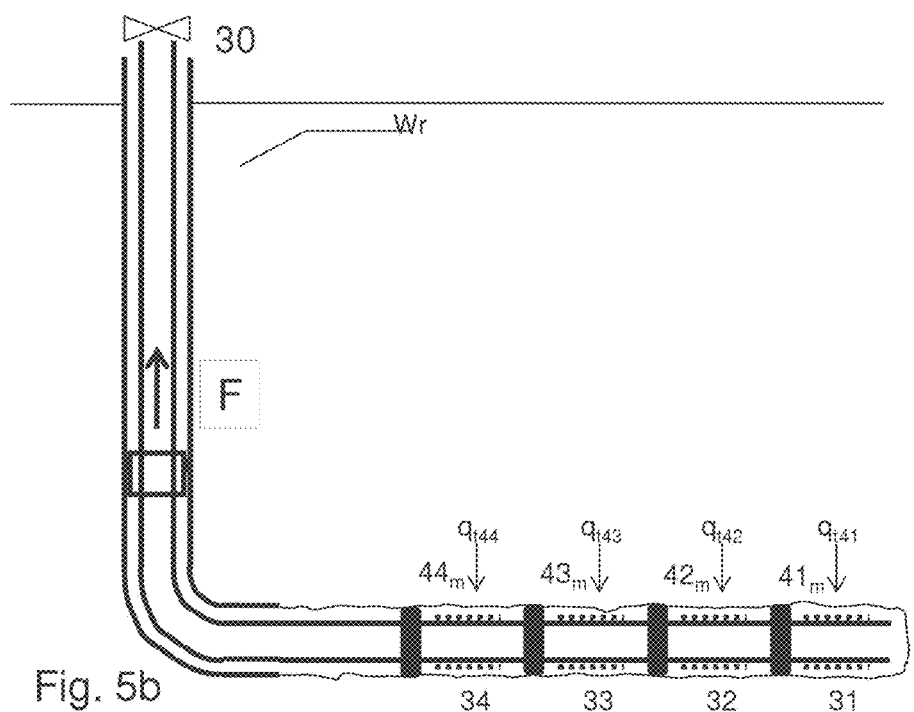
Fig. 5b Fig. 6
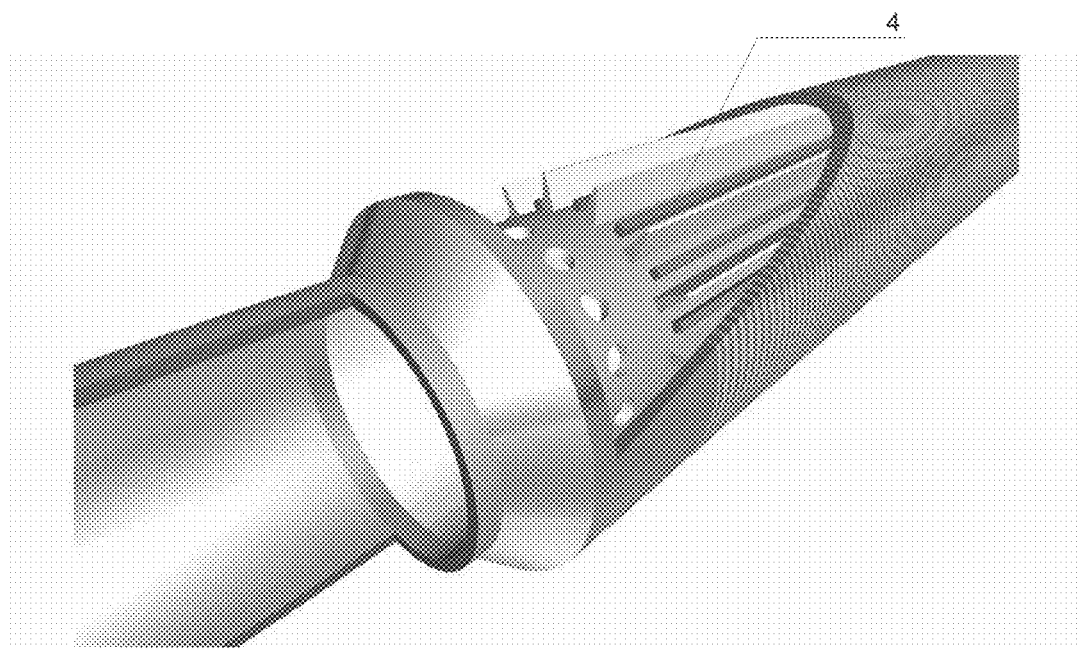
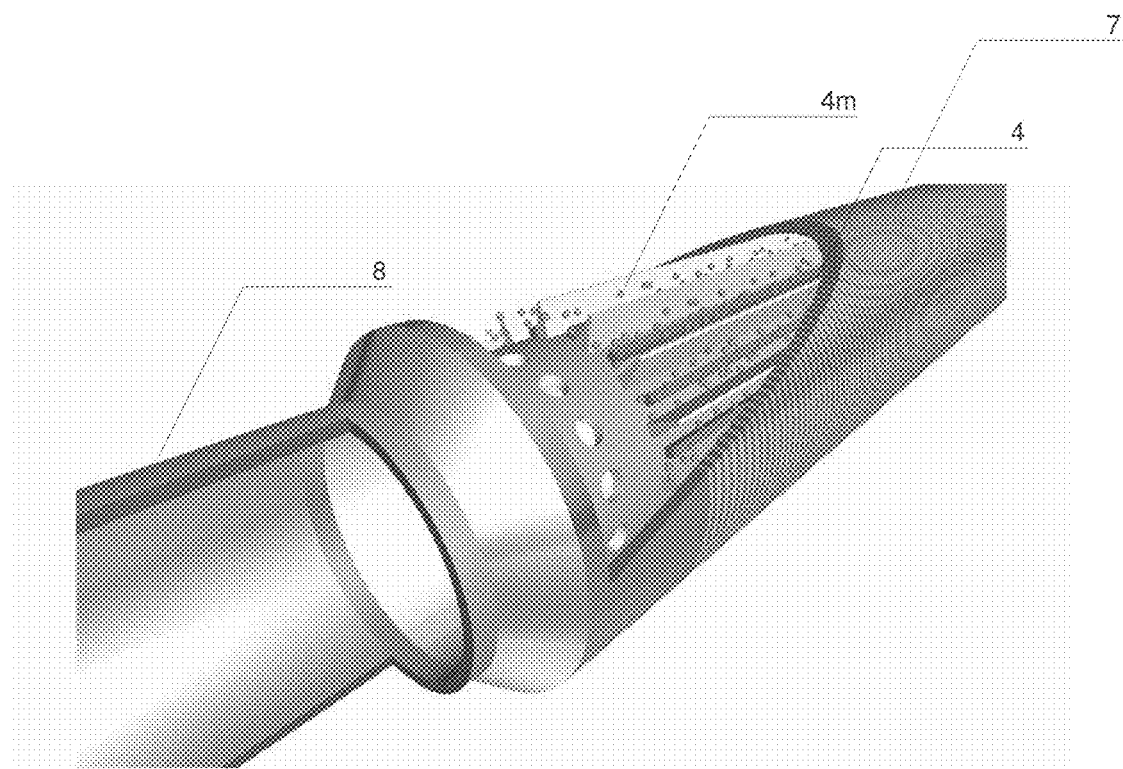
Fig. 7

Fig. 8 Flushout from completion void (isolated zone) with a constant tracer release rate. Fluids flow has a transient.
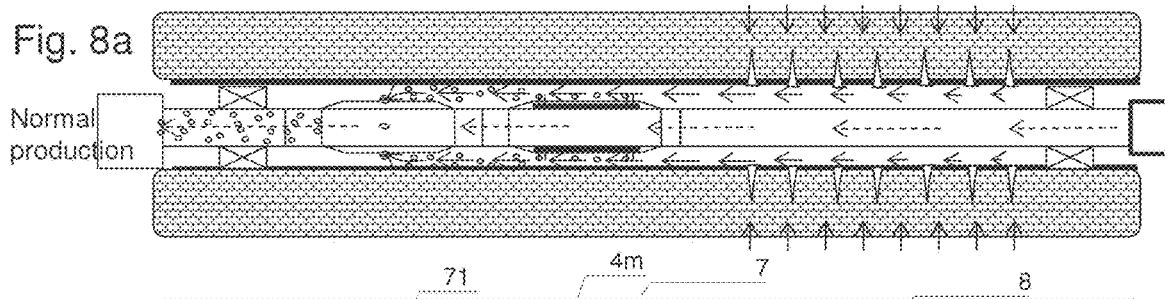
Fig. 8a
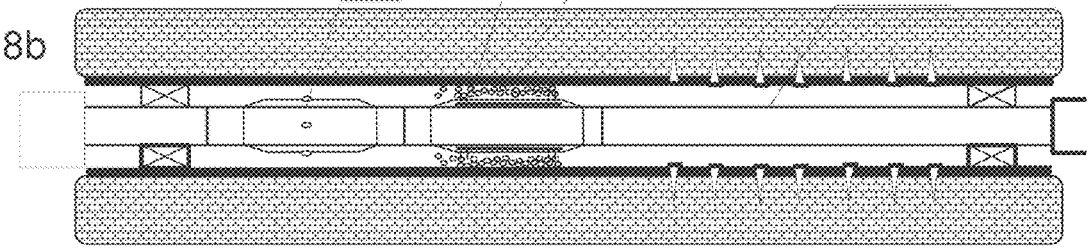
Fig. 8b
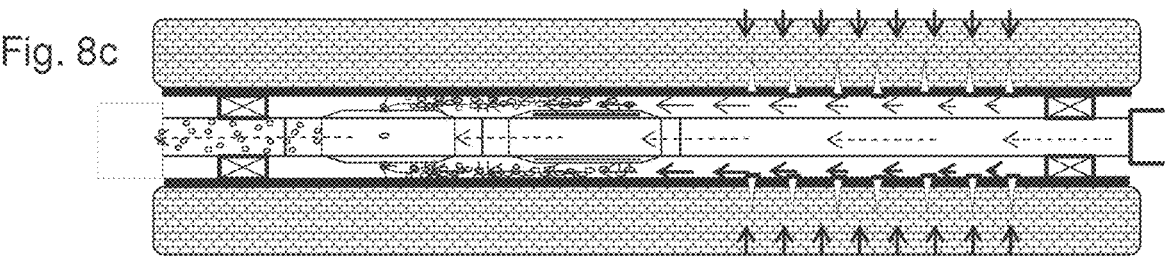
Fig. 8c
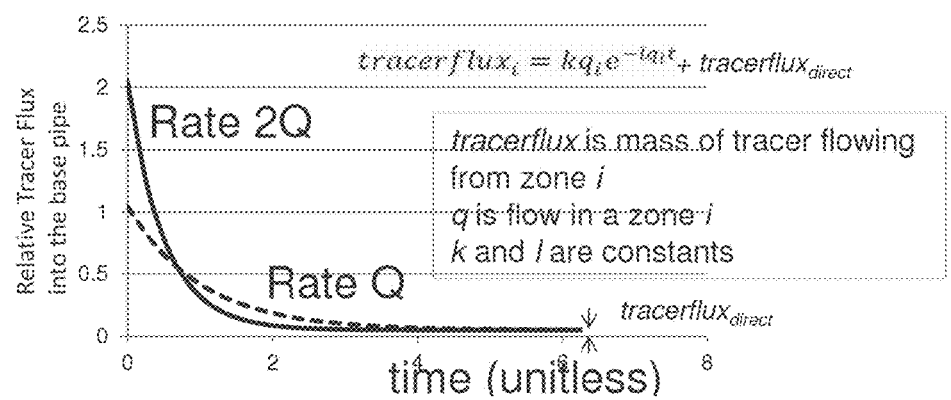
Fig. 9 Tracer shot with long term release (e.g. from polymers)
$tracerflux_i = kq_i e^{-lq_i t} + tracerflux_{direct}$
$tracerflux$ is mass of tracer flowing from zone $i$
$q$ is flow in a zone $i$
$k$ and $l$ are constants

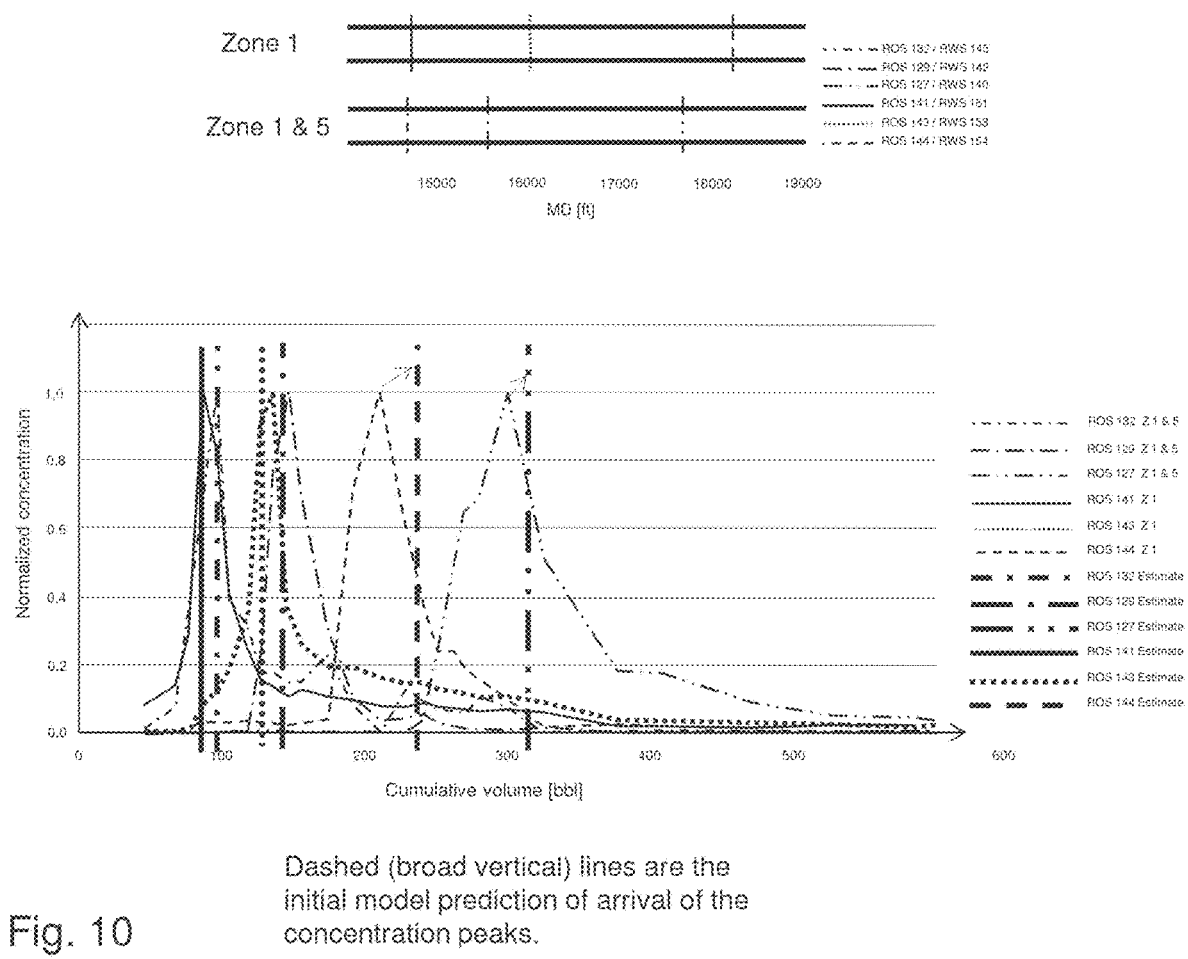
Fig. 10  Dashed (broad vertical) lines are the initial model prediction of arrival of the concentration peaks.

METHOD FOR EXTRACTING DOWNHOLE FLOW PROFILES FROM TRACER FLOWBACK TRANSIENTS

CROSS-REFERENCE TO RELATED APPLICATIONS

This application is a Continuation of U.S. patent application Ser. No. 16/871,939 filed on May 11, 2020, which is a Continuation of U.S. patent application Ser. No. 16/290,130 filed on Mar. 1, 2019 (now U.S. Pat. No. 10,669,839 issued on Jun. 2, 2020), which is a Continuation of U.S. patent application Ser. No. 13/887,046 filed on May 3, 2013 (now U.S. Pat. No. 10,253,619 issued on Apr. 9, 2019), which is a Continuation-in-Part of U.S. patent application Ser. No. 13/882,054 filed on Jun. 20, 2013 (now U.S. Pat. No. 8,949,029 issued on Feb. 3, 2015), which is the National Phase of PCT International Application No. PCT/NO2011/000306 filed on Oct. 31, 2011, which claims priority to U.S. Provisional Application No. 61/408,143 filed on Oct. 29, 2010 and to Patent Application No. 20101521 filed in Norway on Oct. 29, 2010, all of which are hereby expressly incorporated by reference into the present application.

The invention is in the field of reservoir monitoring by estimating downhole inflow profiles by exploiting tracer flowback transients in oil and gas wells. The information may be extracted from the onset of tracer transients (a few samples) or from a full transition from one to the next tracer level (several samples over longer time period).

More specifically the invention relates to either of the following situations:

Even Tracer Release Rate

The situation of tracer concentration transients occurring during changes in the well production rate, when there is a relatively constant downhole tracer release rate. Any flow rate change in such a situation will create changes in the downhole concentration of tracers and markers that are released at relatively constant rates over time. This will also be the case for a situation wherein the tracer is released at constant release rates over longer time period than the characteristic time constant of a change in the flow. An example of this feature is sources that release tracers by diffusion from a solid, such as from a polymer arranged in contact with the fluids in an influx zone to a well. Another example is an object that releases tracer through a restriction, e.g. to a void outside the production pipe in the completion. The applicant's diffusion tracer release carriers has this feature, that after a possible initial burst of tracers, these will more or less have a long period of approximately constant tracer release. Other tracer sources, like packers, seals, cement, etc may not release unique tracers and their position in the well may be uncertain, such as is the case for distributed cement. The constant tracer release rate by diffusion may prove advantageous if the different influx zones have generally equal influx pressures or pressures in equilibrium. Then it is feasible to create the "shots" illustrated in FIGS. 1.2 and 1.3 by shutting in the well because no or very little cross-flow between the zones may arise.

Tracer Release Transients

An other situation is the one wherein a downhole tracer release rate changes while the well flow rate is relatively constant over time. Mechanical tracer release chambers may be the source of such. If several chambers release synchronously in a well the situation may be good as a basis for extracting downhole inflow profile.

A special case is described below although it is covered by one of the points above:

Downhole tracer concentration shots according to an embodiment of the invention are made from defined positions in the completion along the wellbore by shutting in or significantly reducing the flow topsides, thus allowing a local build-up of tracer concentration near each tracer carrier. Sampling is conducted at the surface, and concentration change of the tracer and the corresponding time of their arrival as peaks are registered. In an embodiment this method relies on tracer "shots", i.e. tracers creating small volumes of equally high tracer concentration in the local fluid. In one embodiment this is obtained by utilising the release of the tracer from a polymer arranged in the actual influx zone. The produced oil is sampled at the surface and analyzed for concentration variations and changes in times between the peaks. If there is a high influx of wellbore fluid between two tracer locations, two effects will appear: First, the peak between the two tracer shots will be longer than predicted for an influx that is even all along the completion. Secondly, the tracer shot releasing tracer material being upstream of the high influx zone will pass by the high influx zone on its way to the topsides sampling site, thus its concentration will be diluted compared to the tracer shot material being released downstream.

Tracer transients formed by shut-in or otherwise changes in the flow will propagate to the surface as concentration slugs or shots. The tracer transients are driven by the velocity field in the well. The topside arrivals of the onset of the different tracers, or the full transient of the different tracers, can be used to estimate the downhole velocity field. From the velocity field the inflow profile may be calculated.

In the present invention one may utilize tracer carriers releasing tracer material by diffusion in wells and thus meeting the requirements of having tracer release that have near-constant release rates over time or at rates with constant release rate over significantly longer period than the characteristic time of a change to be detected in the well.

General Background Art

Background art tracer systems other than the applicant's system have shorter active release periods and have erosion- or dissolution-based release of the tracer chemicals. This requires a fundamentally different approach during interpretation than for the present invention since the release of such background art systems is more directly linked to the production rates. Longevity in wells may in such cases generally not be predicted since the tracer will be used up rather according to cumulative production volume than being released at a constant rate with time.

In an embodiment of the invention it is suggested to arrange array of mechanical chambers that is placed along the production zone and will give a tracer shot per location at given synchronized points in time. The tracer shots that are created will travel to the surface with the produced fluids. Flow profiles may be estimated from the measurements of concentration of the different tracer materials conducted at the surface or elsewhere downstream.

Short Definition of the Present Invention

The invention is a method of exploiting tracer transients from producing wells. This may involve the whole or parts of the value chain from downhole tracer release, sampling and analysis and finally extracting the necessary information from tracer transients.

The invention defined in claim 1 is a method of estimating an influx profile ($q_i$) for at least one of the well fluids (oil, gas, or water) to a producing petroleum well (1) with two or more influx zones or influx locations (3, 31, 32, 33) to a production flow (F), comprising the following steps:

arranging new or selecting existing tracer sources (4, 41, 42, 43) with distinct tracer materials (4m, 41m, 42m, 43m) in known levels of the well, at least one of said tracer sources arranged downstream and exposed to the fluids in at least one of said influx zones (3, 31, 32, 33), each said tracer sources (4, 41, 42, 43) having even release rate ($qt_{41}, qt_{42}, qt_{43} \ldots$) to said well fluid, inducing a transient in the production rate (q) of the entire production flow (30), preferably by shutting in by a valve topside, or for at least for one of said influx zones (3), thereby changing the local exposure times of the tracer sources (4) to the fluid, e) collecting samples (c), downstream at known sampling times (t), analysing said samples (c) for concentration (4c) and type of tracer material (4m) from said possible sources (4, 41, 42, 43), based on said concentrations (4c, 41c, 42c, 43c) and their sampling sequence and the well geometry, calculating said influx volumes ($q_i$) from transient flow models, using the calculated influx volumes ($q_i$) as parameters for controlling the production flow or for characterizing the reservoir.

If a series of samples are taken during a time or cumulative production sufficiently long for the shut-in established shots to have been washed out and produced to the topside, one may be sure that a base level of concentration associated with steady state flow has been reached, please see the term tracerflux-direct in FIG. 9.

In an embodiment of the invention, the following steps may be used for establishing a steady-state well flow tracer concentration level by sampling and analysing before the shut-in:

collecting samples (c) from said production flow (F) downstream of said influx locations, at known sampling times or cumulative flow volumes before the shut-in, analysing said samples (c) for concentration and type of tracer material from said possible sources.

The method may also be defined as a system for estimating an influx profile ($q_i$) for at least one of the well fluids (oil, gas, or water) to a producing petroleum well (1) with two or more influx zones or influx locations (3, 31, 32, 33) to a production flow (F), comprising:

tracer sources (4, 41, 42, 43) with distinct tracer materials (4m, 41m, 42m, 43m) arranged in known levels of the well, at least one of said tracer sources arranged downstream and exposed to the fluids in at least one of said influx zones (3, 31, 32, 33), each said tracer sources (4, 41, 42, 43) having even release rate ($q_{t41}, q_{t42}, q_{t43} \ldots$) to said well fluid, a valve arranged in said production flow (30) for inducing a transient in the production rate (q) of the production flow (30), thereby changing the local exposure times of the tracer sources (4) to the fluid, a sampling device for collecting samples (c) downstream at known sampling times (t), a tracer analyzer for said samples (c) for analyzing concentration (4c) and type of tracer material (4m) from said possible sources (4, 41, 42, 43), an algorithm with a transient flow model for calculating, based on said concentrations (4$_c$, 41$_c$, 42$_c$, 43$_c$) and their sampling sequence and the well geometry, said influx volumes ($q_i$), said calculated influx volumes ($q_i$) for being used as parameters for controlling the production flow or for characterizing the reservoir.

Short Figure Captions

FIG. 1 shows a series of diagrams to visualize how the tracer concentrations change as they are transported across the reservoir interval. The downstream piping system and topside equipment is not illustrated.

In FIG. 1 nine frames are shown, FIGS. 1-1 to 1-9 illustrating the technique. Each frame is a time step and describe how the tracer shots move after being built up as a result of a topside shut-in of the well or a significant reduction of the well flow. The diagrams represent a horizontal well, here shown with four tracers of generally constant release per time unit, installed at four positions labelled A, B, C, D. For simplicity in this example the distances between each subsequent tracer position along the wellbore are equal. In a real case there may be many more different tracers installed in a well at a corresponding number of locations. The tracer matrix devices are exposed to the well fluids either from the outside of the completion or inside depending on the carrier system. The tracers are released to the fluids at an even rate with time. When the well flow is shut in, the tracers are concentrated up locally as illustrated in FIG. 1-2. The fluids immediately surrounding the tracer develop a high concentration of the tracer. Such volumes are referred to as a "tracer shot" and typically start off as equal volumes.

In FIG. 1-3 the well flow is opened up topside, and influx has started and each vertical arrow in this example represent a given flow for example 1000 bopd (barrels of oil per day).

As seen the influx from the zone between tracer C and D is three times higher than the influx between zone A and B.

When the tracer slugs start moving with the well fluids as seen in FIG. 1-5 these variations in influx between the zones will affect the volume of fluids between each tracer slug and the concentration of each slug as they pass across the zones.

The volume and hence time difference between the arrival of slug C and D will be longer than between A and B due to the fact that there will be three times more wellbore fluids that are entering in between the two tracer slugs C and D. This is visually represented in the FIGS. 1-6, 1-7, 1-8 and 1-9. Also the concentration of tracer slug D will become more diluted and spread out as a result of this higher influx, this is also visualized in FIGS. 1-6 to 1-9.

FIG. 2 is an idealised illustration of concentration of identified tracers sampled topside, with time or cumulative production volume (since the release of the flow) as the abscissa.

FIG. 3 is an illustration of an approach for matching the unknown downhole influx rates in the downhole production zones with the modelled influx rates. The model influx rates are adjusted until the calculated concentrations of model tracers compare well with the measured concentrations of identified tracers.

FIG. 4 shows different configurations for the downhole completions and how the tracer systems are placed into these, please see the red rods.

Figure 11:
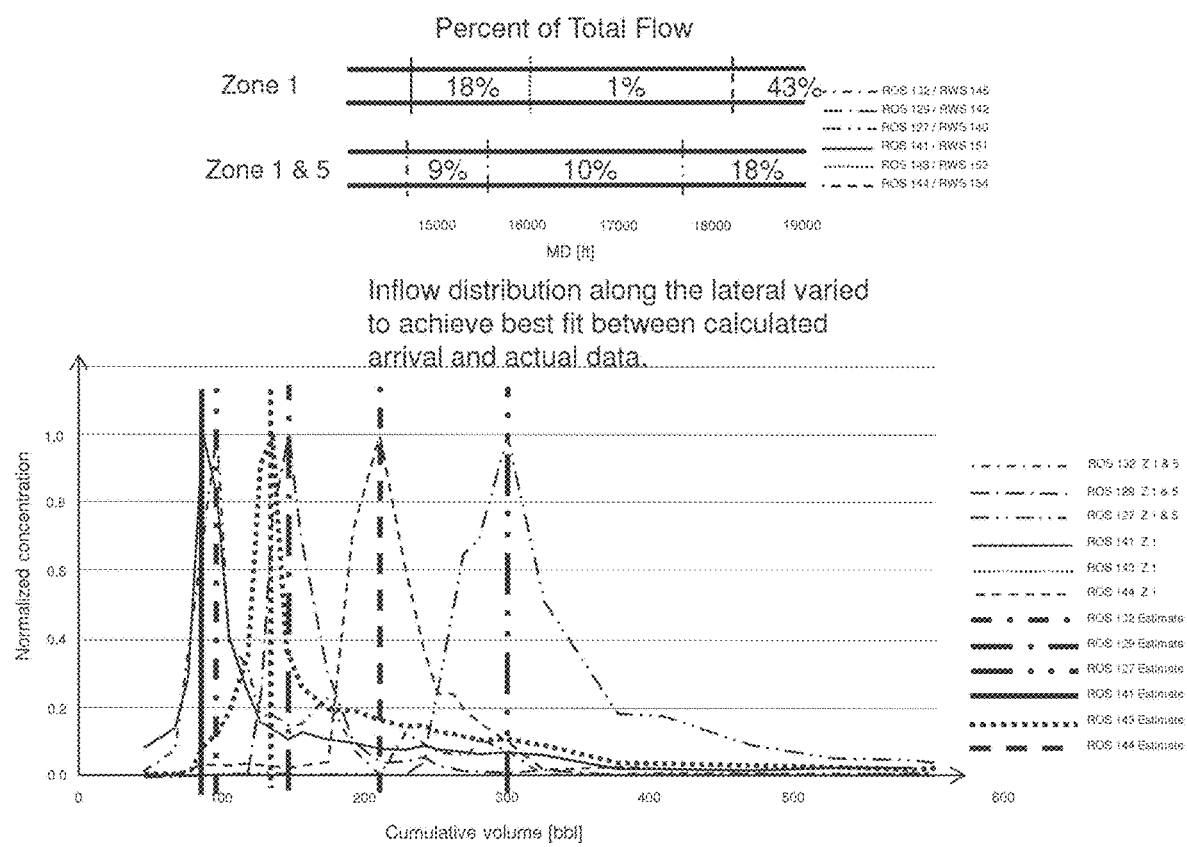

FIG. 5a is a simplified section through a petroleum well. Influx volumes of fluids enters from the reservoir rocks to end up in a production flow in a central production pipe in the well provided with two or more separate influx locations. In this situation the influx zones may not be precisely known and it is not taken for granted that the tracers are placed where the influx exactly occurs.

FIG. 5b is a simplified section through a petroleum well wherein packers are arranged for mutually isolating the influx zones. In this situation the tracers are also placed each in its separate influx zone. There may be many more influx zones and tracer carriers than what is illustrated in FIGS. 5a and b.

FIG. 6 shows an influx control device sub arranged for being arranged in-line with the production tubing and is provided with a partially cut-away screen towards the surrounding rocks (not shown) in the borehole in an influx zone, and with polymer rods with tracer materials arranged in the annular space under the screen, and with exit holes for fluid arranged at the downstream end of the sub. Please see FIG. 8 for a section through such an arrangement. No leaked-out tracers are indicated.

FIG. 7 illustrates the same influx control device sub as in FIG. 6, but wherein the tracer material (indicated as small particles, although the tracers actually are not particles) has built up in the fluids present in the annulus space in the sub, and wherein the flow is halted temporarily in order to build up the tracer concentration as a "tracer shot" within the sub.

FIG. 8 comprises illustrations of a situation according to the invention wherein the tracer shot is built over time from the tracer leak-out from polymers into still shut-in fluids. The flowback of the shot to surface is then done during production ramp-up. In this example, the shut in of the flow is a transient in time with a resulting build-up of the shot.

FIG. 8a illustrates one insulated influx zone insulated by a lower (right) and an upper (left) packer defining a zone of influx of petroleum fluids (and/or water) entering the annulus about the production tubing, the fluids passing a polymer carried tracer, and the fluids with more or less tracer material leaving the annulus space through apertures in the central production tube to the production flow which passes towards the topside. FIG. 8a illustrates a situation wherein the topsides flow is flowing, and wherein the tracer is released more or less at a constant rate over long time, e.g. tracers from a polymer rod arranged in the annular space outside the central production tube. The fluid carries tracer with it at a generally even rate with the production flow.

FIG. 8b illustrates the result of a shut-in downstream (topside) in order to build a concentration in the annulus space, called to build a "shot". A tracer shot of short spatial extension is created. The dispersion of the tracer material will be a function of turbulence and flow geometry in the annulus space, and if the flow topsides is halted, one would expect the dispersion within the void to be very little.

FIG. 8c illustrates that the tracer concentrated fluid (the "shot") is flushed out with resumption of the production by opening the topside valve, and the built-up shot will be flushed out as a longer pulse than what would have been obtained if the tracer was built up directly to the still-standing production flow. The concentration of the tracer as sampled and measured topside will be similar to one of the curves of FIG. 2.

FIG. 9 shows ideal curves of tracer shot release into the base pipe from the annulus void of FIG. 8c into the central production pipe (base pipe) as a function of time or cumulative flow, in the situation of shut-in with long term release of tracer, and subsequent release. Please notice that both curves cannot approach nil concentration as the doses are continually released. The higher rate will flush out fastest and die out faster, while the lower influx rate will wash out at a lower rate, but both may be at a detectable level for very long time.

FIG. 10 relates to a setup with accumulated tracer shots being flushed into the central base pipe, or already built up in the central base pipe, as also explained in FIG. 1. FIG. 10 shows curves of tracer concentrations as function of cumulative production volume topside. In the upper portion of the drawing there is illustrated highly simplified illustrations of two parallel production zones called "zone 1" and "zone 1 & 5" (which may produce into the same main well) or two wells on the same tie-back, leading to the same topsides sampling site. The vertical coloured lines are the positions of tracers in insulated influx zones to the two branches. The different coloured lines in the curves indicate measured concentrations (interpolated). The vertical bars of same colours indicate peak arrivals (as function of cumulative volume) if even influx rates had existed and this is calculated from models. One will see that the first (heel) production of zone 1 and zone 1 & 5 arrive almost as predicted from the even rate model, but that the toe marker of zone 1 arrives far too early and its influx must be higher than presumed, and the nearer toe of zone 1 & 5 arrives too late and may be due to a lower influx than presumed. This indicates that the influx model should be adjusted significantly.

FIG. 11 shows the same measured curves and well models as for FIG. 10 above. A general scheme of comparison between the Real World and the model world as shown in FIG. 3 may be used. The difference is that here the influx model of "zone 1" and "zone 1 & 5" are heavily corrected to indicate influx rates downhole "zone 1" of 18%, only 1%, and as high as 43% contributions to the combined total flow topside, and for zone 1 & 5 contributions of 9% at the heel, 10%, and 18% at the toe. Here we see that the middle production zone of "zone 1" contributes insignificantly and may be shut down or considered as a candidate for an overhaul. One will now see that the predicted peak arrivals coincide with the actual peaks.

As an improvement, further curve analysis could be conducted in order to determine the assumed continuous curve peak arrivals from the non-continuous measurement results, as the peak of a non-continuous series is not necessarily the real peak. Anyway, the illustrated match is far better than for FIG. 10.

Figure 12:
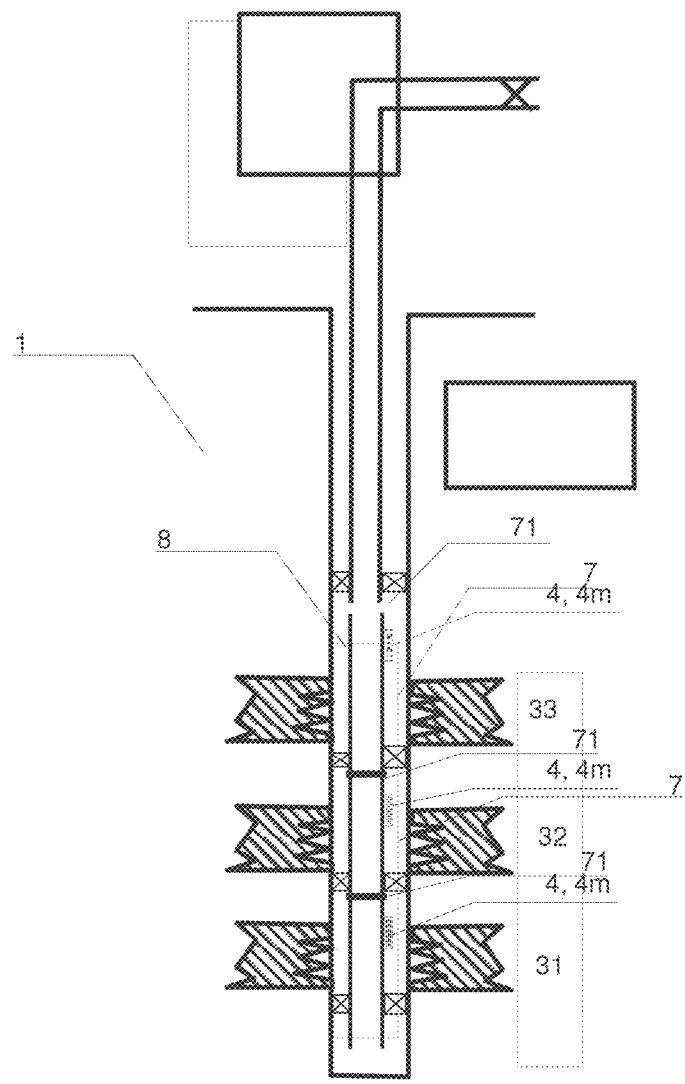

FIG. 12 is a production pipe arrangement for a producing petroleum well (1) with at least one of the well fluids (oil, gas, or water)

with influx fluids (qi, q1, q2, q3, q44) in two or more influx zones or influx locations (3, 31, 32, 33, 34) to a production flow (F) in a central production pipe (8) in said well (1), with tracer sources (4, 41, 42, 43, 44) with distinct tracer materials (41m, 42m, 43m, 44m) in known levels of the well, one or more separate delay chambers (7) arranged as a completion component in said pipe (8).

DESCRIPTIONS OF EMBODIMENTS OF THE INVENTION

The process block diagram shown in FIG. 3 provides an overview description of how a tracer transient interpretation system may be designed. The main objective is to produce interpretation reports that tells the well operator about the downhole inflow profiles. These may then plug into the customer's decision processes. Crucial are the different models and the model should be tuneable so that history matching deviations can be reduced.

To be able to estimate downhole inflow profiles it is of importance to have good overview of all characteristic time constants that govern the signature of the tracer flowback. It would be desirable that the characteristic time constant of the actual change is significantly shorter than other time constants so that some of the impacting processes over the monitoring period could be regarded as constant.

The invention is a method of estimating an influx profile ($q_i$) for at least one of the well fluids (oil, gas, or water) to a producing petroleum well (1) with two or more influx zones or influx locations (3, 31, 32, 33) to a production flow (F). The method comprises the following steps:

Arranging new or selecting existing tracer sources (4, 41, 42, 43) with distinct tracer materials (4m, 41m, 42m, 43m) in known levels of the well. The tracer sources are arranged at, or immediately downstream, said influx zones (3, 31, 32, 33), in fluid contact. Each said tracer sources (4, 41, 42, 43) has a generally even leak-out rate ($q_{t41}$, $q_{t42}$, $q_{t43}$ . . . ) such as by diffusion to the well fluid under wetting. This is done preferably by wetting by the fluid.

Inducing a transient in the production rate (q) of the entire production flow (30), such as by using a valve system topside, or for at least for one of said influx zones (3, 31, 32, 33), thereby changing the local exposure times of the tracer sources (4, 41, 42, 43) to the fluid. In practice, this may be by opening up the topsides flow after a shut-in of the well.

Collecting samples ($c_1$, $c_1$, . . . ), downstream at known sampling times ($t_1$, $t_1$, . . . ), and Analysing the samples ($c_1$, $c_1$, . . . ) for concentration (4c, 41c, 42c, 43c) and type of tracer material (4m, 41m, 42m, 43m) from the possible sources (4, 41, 42, 43)

Subsequently, calculating the influx profile ($q_i$) based on a response in the concentrations (4c, 41c, 42c, 43c) and type of tracer materials in the samples as a function of the sampling times.

If a series of samples are taken during a time or cumulative production sufficiently long for the shut-in established shots to have been washed out and produced to the topside, one may be sure that a base level of concentration associated with steady state flow has been reached, please see the term tracerflux-direct in FIG. 9.

In an embodiment of the invention, the following steps may be used for establishing a steady-state well flow tracer concentration level by sampling and analysing before the shut-in:

b) Collecting samples (c1, c2, c3, . . . ) from the production flow (F) downstream of the influx location (3, 31, 32, 33), at known sampling times (t1, t2, t3, . . . ).

c) Analysing the samples (c1, c2, c3, . . . $c_N$) for concentration (4c, 41c, 42c, 43c) and type of tracer material (4m, 41m, 42m, 43m) from the possible sources (4, 41, 42, 43).

Stated in another way the above method could be stated alternatively as:

Collecting at known sampling times (t1, t2, t3, . . . $t_N$, $t_{N+1}$, . . . ) (or collecting at cumulative production volumes) a series of samples (c1, c2, c3, . . . , cN) from the production flow (F) downstream of the influx location (3, 31, 32, 33).

Analysing, the series of samples (c1, c2, c3, . . . , $c_N$) for concentration (4c, 41c, 42c, 43c) and type of tracer material (4m, 41m, 42m, 43m) from the possible sources (4, 41, 42, 43).

Based on said concentrations ($4_c$, $41_c$, $42_c$, $43_c$) and their sampling sequence and the well geometry, calculating said influx volumes ($q_i$) from transient flow models.

The calculated influx volumes ($q_i$) are used as parameters for controlling the production flow or for characterizing the reservoir.

During the sampling time series, inducing at least one transient in the production rate (q) of the entire production flow (30), such as by using a valve system topside, or for at least for one of said influx zones (3, 31, 32, 33), thereby changing the local exposure times of the tracer sources (4, 41, 42, 43) to the fluid.

The flow transient may be induced e.g. by making a step change, e.g. increase or reduction, in the overall production rate of the well, shutting down the well for a time and re-opening it. A series of step changes may be introduced. Other transients than step changes may be imagined, but the transient must have sufficient amplitude and temporal significance in order to be detected downstream through the often long material piping system.

It is important that sufficient amounts of tracers are accumulated, i.e. that the shut-in time is sufficiently long so as for the transient to be detectable downstream.

Thus one may induce or utilize induced tracer transients made by a flow transient to see the system's response to the transient in the chemical analysis results downstream. This may be compared to an influx model in a way described below, and thus be used to determine the influx pattern from the reservoir.

In an embodiment of the invention, one may, before conducting step (d), i.e. of inducing a transient in the production rate assume, by simulation or by experience, expect or confirm through measurements, that a steady state condition is achieved and the concentrations (4c, 41c, 42c, 43c, . . . ) of tracer materials (4m, 41m, 42m, 43m) in the samples (c1, c2, c3, . . . , $c_N$), before the transient is introduced. A better alternative is to assume steady-state flow is reached after shut-in and resumption of flow after a given time, usually indicated in the curves when the concentrations of tracers have approached their base levels again.

In an embodiment of the invention, the transient in the production rate (q) may be induced by shutting down said production flow (F), such as by shutting down topside at a first instant. The shutdown will result in a local accumulation of the tracer material (4m, 41m, 42m, 43m) near the tracer sources. Subsequently the production rate (q) is increased by opening the production flow at a desired known instant. This may be called creating an artificial "tracer shot", where the tracer sources themselves need not be manipulated.

In an embodiment, local chemically traceable pollutants such as decaying gaskets or cements may be utilized, but a method using known tracers with known properties and arranged at known locations are preferred.

According to an embodiment of the invention, a transient in the production rate (q) is induced locally by shutting down one or more of said local influx rates (q21, q22, q23 . . . ), such as by shutting down local valves, at a first instant, for local accumulation of at least some of the tracer's tracer material (4m, 41m, 42m, 43m) near the tracer sources, and for subsequently increasing the production rate (q) by increasing those one or more of said influx rates (q21, q22, q23 . . . ), such as opening the local valves to full aperture (or their ordinary operating aperture, which may be less than full for some valves), at a desired known instant.

According to an embodiment of the invention, the analysis of the samples (c1, c2, c3, . . . $c_N$) for the concentrations (4c, 41c, 42c, 43c, . . . ) and type of tracer materials (4m, 41m, 42m, 43m) from the possible sources (4, 41, 42, 43) is conducted generally after the sampling is done at one or more of said sampling times. This is particularly valid if the concentrations are very low and the analysis is time-consuming and requires high accuracy in a lab.

In an embodiment of the invention, the analysis of the concentrations (4c, 41c, 42c, 43c, ... ) of tracer materials (4m, 41m, 42m, 43m) in the samples (c1, c2, c3, ... $c_N$) may be conducted on site, generally simultaneously, immediately during or after the sampling conducted at the one or more of said sampling times. This embodiment of the method may be relevant if the tracer concentration and thus the detectability is sufficiently high so as to enable immediate, rapid analysis, such as by using a chemical sensor in the production flow, or extracting samples that are analyzed automatically there and then at the topside location. Such a sensor may provide concentration measurements more or less continuously. Such a sensor may further provide a measurement signal online.

According to an embodiment of the invention one or more of the tracer sources (4, 41, 42, 43) is arranged in a separate corresponding one or more delay chambers (7), please see FIG. 6 and FIG. 7, the delay chamber having one or more apertures (71) to the fluid flow, the delay chamber (7) arranged for ventilating out fluid with leaked tracer material at a time constant which is significantly longer than the diffusion rate from the tracer source (4, 41, 42, 43) to the liquid.

Such a delay chamber (7) may be constituted by an ordinary component of the well, such as a completion pipe whereupon the one or more tracer source (4, 41, 42, 43) is arranged in the annular space formed between said completion pipe and the borehole wall, please see FIGS. 6, 7, and 8.

The transient in production flow utilized in an embodiment of the invention does not necessarily be induced solely for the purpose of the present method, but may occur in the system anyway. The transient used in the invention may be a naturally or technically occurring transient in the production rate, such as a temporary shutdown of the production for minutes or hours, the closing and/or opening of valves from tracer marked portions of the production pipe, which may be utilised as the actual transient in the production rate.

Generally, the influx profile ($q_i$) comprises two or more influx rates (q21, q22, q23 ... ) in two or more corresponding influx zones or influx locations (31, 32, 33, ... ).

In an embodiment of the invention, the calculation of the influx profile ($q_i$), an abstract model well (1') corresponding to the actual production well (1) is established, including a model transport path (P') corresponding to said well's (1) transport path (P) downstream of, that is after said influx profile ($q_i$), nearer to the wellhead.

The model well (1') should have model influx rates (q'21, q'22, q'23 ... ) to corresponding model influx locations (31', 32', 33', ... ) corresponding to the assumed real influx locations (31, 32, 33), and be provided with model tracer sources (4', 41', 42', 43') with distinct modelled tracer materials (4'm, 41'm, 42'm, 43'm) in known levels of the model well (1') corresponding to the real tracer sources (4, 41, 42, 43).

Each model tracer source (4', 41', 42', 43') should be modelled according to whether it is a release (leakout) with a generally flat rate (at the time scales considered) from a polymer if that is the relevant release mechanism.

In the model, concentration (4'c, 41'c, 42'c, 43'c) for the type of modelled tracer material (4'm, 41'm, 42'm, 43'm) is then calculated in a modelled well flow transport path (P') from and including the first "toe" influx zone to the wellhead, as a function of time under a modelled transient occurring in the model.

Then one may compare the actually measured concentrations (4c, 41c, 42c, 43c) and type of tracer material (4m, 41m, 42m, 43m) over time, with the calculated model concentrations (4'c, 41'c, 42'c, 43'c) for the type of modelled tracer material (4'm, 41'm, 42'm, 43'm), and adjust the model influx rates (q'21, q'22, q'23 ... ) so as for improving the consistency between the model influx profile ($q_i$, q'21, q'22, q'23 ... ) and the real influx profile ($q_i$).

Special Case on Accumulated Tracer Shots

In FIG. 1, a series of diagrams are provided to help visualize how the tracer concentrations change as they are transported across the reservoir interval.

Nine frames are shown, FIGS. 1-1 to 1-9 illustrating the technique. Each frame is a time step and describe how the tracer shots move after being built up as a result of either a shut-in of the well flow or a change in well flow. The diagram represents a horizontal well with four tracers of generally constant release per time unit, installed at positions labelled A, B, C, D. For simplicity in this example the distances between each subsequent tracer position along the wellbore are equal.

The tracer matrix devices are exposed to the well fluids either from the outside of the completion or inside depending on the carrier system. When they come in contact with oil (or water if they are a water tracer system) the tracer chemicals are emitted from the matrix at a fairly constant rate. If there is no flow as illustrated in FIG. 1-2, then the fluids immediately surrounding the tracer develop a high concentration of the tracer. Such volumes are referred to as a "tracer shot" and typically start off as equal volumes.

In FIG. 1-3 the well influx has started and each vertical arrow in this example represent a given flow for example 1000 bopd (barrels of oil per day).

As seen the influx from the zone between tracer C and D is three times higher than the influx between zone A and B.

When the tracer slugs start moving with the well fluids as seen in FIG. 1-5 these variations in influx between the zones will affect the volume of fluids between each tracer slug and the concentration of each slug as they pass across the zones.

The volume and hence time difference between the arrival of slug C and D will be longer than between A and B due to the fact that there will be three times more wellbore fluids that are entering in between the two tracer slugs C and D. This is visually represented in the FIGS. 1-6, 1-7, 1-8 and 1-9. Also the concentration of tracer slug D will become more diluted and spread out as a result of this higher influx, this is also visualized in FIGS. 1-6 to 1-9.

When the tracers arrive downstream at surface (see right figure) and it is analyzed and modelled against a wellbore fluid simulation model using the described influx principle then an answer can be given, using the method of the present invention, on how much flow is coming from each zone between the tracer locations in the well.

What is claimed is:

1. A method of estimating an influx profile for at least one well fluid to a producing petroleum well with two or more influx zones or influx locations to a production flow,
   wherein the well comprises tracer sources with distinct tracer materials in known levels of the well, at least one of said tracer sources arranged at or downstream and exposed to the fluids in at least one of said influx zones, and
   wherein each said tracer sources has an even release rate to said well fluid, the method comprising the steps of:
- analysing samples of production fluid for concentration and type of tracer material, the samples having been collected from the production flow at a location downstream of the tracer sources at known sampling times after inducing a transient in the production rate thereby changing the local exposure times of the tracer sources to the fluid to create a tracer transient;
- and based on the analysed concentrations and type of tracer materials in the samples as a function of the sampling times, calculating said influx profile.

2. The method according to claim 1, further comprising using the calculated influx profile as parameters for controlling the production flow or for characterizing the reservoir.

3. The method according to claim 1, wherein the analysis of tracer materials in the samples is conducted generally after the sampling is conducted at one or more of said sampling times.

4. The method according to claim 1, wherein the analysis of tracer materials in the samples is conducted generally on site, immediately after said sampling conducted at said one or more of said sampling times.

5. The method according to claim 1, wherein said influx profile comprises two or more influx rates in two or more corresponding influx zones or influx locations.

6. A method of collecting samples for use in estimating an influx profile for at least one well fluid to a producing petroleum well with two or more influx zones or influx locations to a production flow,
- wherein the well comprises tracer sources with distinct tracer materials in known levels of the well, at least one of said tracer sources arranged at or downstream and exposed to the fluids in at least one of said influx zones, and
- wherein each said tracer source has an even release rate to said well fluid;

the method comprising the steps of:
- inducing a transient in the production rate thereby changing the local exposure times of the tracer sources to the fluid to create a tracer transient;
- collecting samples at a location downstream of the tracer sources after inducing the transient.

7. The method according to claim 6, comprising inducing a transient in the production rate of the entire production flow or for at least one of the influx zones.

8. The method according to claim 6, wherein an otherwise naturally or technically occurring transient in the production rate is utilised as said transient in the production rate.

9. A method of estimating an influx profile for at least one well fluid to a producing petroleum well with two or more influx zones or influx locations to a production flow,
- wherein the well comprises tracer sources with distinct tracer materials in known levels of the well, at least one of said tracer sources arranged at or downstream and exposed to the fluids in at least one of said influx zones, and wherein each said tracer sources has an even release rate to said well fluid;

the method comprising the steps of:
- analysing measured concentrations of tracer, the concentrations of tracer having been measured from samples collected from the production flow at a location downstream of the tracer sources at known sampling times after inducing a transient in the production rate thereby changing the local exposure times of the tracer sources to the fluid to create a tracer transient;
- and based on the measured concentrations and type of tracer materials as a function of the sampling times, calculating said influx profile.

10. The method according to claim 9 comprising calculating said influx profile from at least one transient flow model.

11. The method according to claim 10, wherein the model comprises:
- a well flow model of zonal flow rates;
- a downhole tracer marking system model; and
- a tracer migration path model.

12. The method according to claim 9, comprising comparing the measured concentrations and type of tracer material with a calculated model concentration for the type of modelled tracer material, and adjusting the model influx rates to improve the consistency between a model influx profile and the real influx profile.

13. The method according to claim 9, comprising the step of tuning the model by adjusting model zonal flow rates to reduce history matching deviations between the calculated concentrations and measured concentrations.

14. A system for estimating an influx profile for at least one well fluid to a producing petroleum well with two or more influx zones or influx locations to a production flow, the system comprising:
- tracer sources with distinct tracer materials arranged in known levels of the well, at least one of said tracer sources arranged at or downstream and exposed to the fluids in at least one of said influx zones;
- wherein each said tracer source has an even release rate to said well fluid;
- the system comprises a valve arranged in said production flow configured to induce a transient in the production rate, thereby changing the local exposure times of the tracer sources to the fluid.

15. The system according to claim 14 comprising a sampling device for collecting samples (c) downstream at known sampling times (t).

16. The system according to claim 14 comprising a tracer analyzer for said samples for analyzing concentration and type of tracer material from said possible sources.

17. The system according to claim 14 wherein the valve is configured to induce a transient in the production rate of the entire production flow or for at least one of the influx zones.

* * * * *